United States Patent
Lamine et al.

(10) Patent No.: US 8,405,896 B2
(45) Date of Patent: Mar. 26, 2013

(54) CONTROLLED-TRANSPARENCY ELECTROCHROMIC DEVICE

(75) Inventors: Driss Lamine, Paris (FR); Emmanuel Valentin, Le Plessis Trevise (FR); Samuel Dubrenat, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/922,341

(22) PCT Filed: Apr. 15, 2010

(86) PCT No.: PCT/FR2010/050723
§ 371 (c)(1),
(2), (4) Date: Oct. 15, 2010

(87) PCT Pub. No.: WO2010/119228
PCT Pub. Date: Oct. 21, 2010

(65) Prior Publication Data
US 2012/0019889 A1      Jan. 26, 2012

(30) Foreign Application Priority Data
Apr. 16, 2009  (FR) .................................. 09 52491

(51) Int. Cl.
*G02F 1/15* (2006.01)
(52) U.S. Cl. ..................................... 359/265
(58) Field of Classification Search ........... 359/265–275
See application file for complete search history.

(56) References Cited

U.S. PATENT DOCUMENTS

| | | | |
|---|---|---|---|
| 4,878,743 A | 11/1989 | Aikawa et al. | |
| 5,530,581 A * | 6/1996 | Cogan | 359/265 |
| 5,724,175 A * | 3/1998 | Hichwa et al. | 359/265 |
| 7,230,748 B2 * | 6/2007 | Giron et al. | 359/265 |
| 2004/0053125 A1 | 3/2004 | Giron et al. | |
| 2008/0030836 A1 * | 2/2008 | Tonar et al. | 359/271 |

FOREIGN PATENT DOCUMENTS
WO    WO 02/06889 A1    1/2002

OTHER PUBLICATIONS

U.S. Appl. No. 12/922,351, filed Oct. 15, 2010, Lamine, et al.
U.S. Appl. No. 12/920,756, filed Nov. 9, 2010, Valentin, et al.
International Search Report issued Aug. 9, 2010 in Application No. PCT/FR2010/050723.

* cited by examiner

*Primary Examiner* — Joseph P Martinez
(74) *Attorney, Agent, or Firm* — Oblon, Spivak, McClelland, Maier & Neustadt, L.L.P.

(57) ABSTRACT

The present invention relates to an electrochromic device having at least one active area (CDEF), having, on a carrier substrate (3), a multilayer stack comprising a layer forming a lower electrode (4), various functional layers (7) at least one of which is an electrochromic layer, at least one (6, 7a) of these layers being electrically insulating, and an upper electrode (9), in which device:

- at least one partition (5) separating the surface of the lower electrode (4) into two isolated regions, namely a free region (4a) and an active region (4b) containing the active area (CDEF); and
- at least one partition (12) separating the surface of the upper electrode (9) into two regions electrically isolated from each other, namely a free region (9a) and an active region (9b) containing the active area (CDEF).

17 Claims, 6 Drawing Sheets

CONTROLLED-TRANSPARENCY ELECTROCHROMIC DEVICE

The present application is the U.S. national stage of international application PCT/FR2010/050723, filed on Apr. 15, 2010, the text of which is incorporated by reference, and claiming the benefit of the filing date of French application number 0952491, filed on Apr. 16, 2009, the text of which is incorporated by reference.

The present invention relates to a controlled-transparency electrochromic device, in particular a device designed for use in electrically controllable glazing and to a process for fabricating said device. The invention also relates to electrochromic glazing provided which such a device and to the use of this glazing in the widest variety of applications.

Glazing with a light transmission capacity that may be adjusted from a good transparency level to total opacity is known. Such glazing has been applied to the widest variety of technical fields.

The glazing may thus be used as windows for a dwelling so as for example to regulate the amount of sunlight entering a room depending on the conditions outside and the desires of the users. The glazing may also be used for partition screens to preserve the privacy of the occupants of a room either with respect to the outside or with respect to adjoining rooms.

Such devices may also be used in the automotive field, for example, to adjust the transparency of the windshield and/or of the side windows or of the sunroof of an automobile, as well as the transparency of some of the accessories of said automobile, such as, in particular, the rearview or wing mirrors, so as to control the flux of light reflected toward the driver and to avoid dazzling the latter. Of course they may also be used in other fields such as, in particular, the aeronautical field to control for example the transparency of aircraft cabin windows.

It is known that electrochromic devices comprise a layer of an electrochromic material capable of inserting, reversibly and simultaneously, ions and electrons, the oxidation states of which, corresponding to the inserted and ejected states, have a distinct color when they are supplied via a suitable power supply, one of these states having a higher light transmission than the other. The electrochromic material may be, for example, based on tungsten oxide and must be brought into contact with an electron source, such as for example a transparent electrically conductive layer, and with an ion (cation and anion) source such as an ionically conductive electrolyte. It is known that a counter-electrode, also capable of reversibly inserting cations, must be associated with the layer of electrochromic material, symmetrically with respect to said layer, so that, macroscopically, the electrolyte appears as a single ion medium. The counter-electrode must be constituted of a layer which is neutral in color or, at least, transparent or barely colored when the electrochromic layer is in the colored state.

Since tungsten oxide is a cathodic electrochromic material, i.e. its colored state corresponds to the most reduced state, an anodic electrochromic material based on nickel oxide or iridium oxide may be, for example, used for the counter-electrode. It has also been proposed to use a material which is optically neutral in the oxidation states in question, such as, for example, cerium oxide or organic materials such as electronically conductive polymers (polyaniline) or Prussian blue.

At the present time, electrochromic systems may be put into two categories depending on the electrolyte used.

In the first category, the electrolyte may thus take the form of a polymer or a gel, such as for example a proton-conductive polymer, such as those described in European patents EP 0 253 713 and EP 0 670 346, or a polymer conducting by lithium ions, such as those described in the patents EP 0 382 623, EP 0 518 754 and EP 0 532 408. These systems are then called "hybrid" electrochromic systems.

In the second category, the electrolyte may also be constituted of a mineral layer forming an ion conductor which is electrically isolated. Theses electrochromic systems are then referred to as "all solid-state" systems. The reader may refer to European patents EP 0 867 752 and EP 0 831 360.

Other types of electrochromic systems are known, such as in particular what are called "all polymer" electrochromic systems, in which two electrically conductive layers are placed on either side of a multilayer stack comprising a cathodic-coloration polymer, an ion-conductive electronically insulating polymer (most particularly for $H^+$ or $Li^+$ ions) and finally an anodic-coloration polymer (such as polyaniline or polypyrrole).

It is known that the current electrochromic device fabrication technique consists, schematically, in successively depositing onto a support substrate, whether transparent or not, a lower electrically conductive layer, generally a layer of indium tin oxide (ITO), functional electrochromic layers, for example iridium oxide (IrOx), tungsten oxide ($WO_3$), tantalum oxide ($Ta_2O_5$), and an upper electrically conductive electrode. Usually, the multilayer stack is completed by a lamination polymer and a counter-substrate.

Of course, the two upper and lower electrically conductive electrodes must be joined to respective current-supply connectors. This connection is usually by means of metal shims which are brought into contact with the upper electrode and with the lower electrode.

Although bringing the connector into contact with the upper electrode presents almost no difficulties in principle, this is not the case for the contact of the connector with the lower electrode because the latter is inaccessible due to the deposition of the various layers. This is why, a region of the latter denoted a "connection region" is maintained, by means of an adhesive mask, during the deposition of the electrochromic layers. Once the various layers are deposited the adhesive may be removed, lifting off, simultaneously, the layers deposited on it and thus allowing access to the lower electrode, the latter then receiving the connector which is intended for it.

This technique has a number of drawbacks linked, particularly, on the one hand, to the use of the adhesive mask and, on the other hand, to the means used to fix the connectors to the electrodes.

As regards the adhesive mask, its placement is a long and delicate operation, where, on the one hand, the adhesive mask must be applied onto the lower electrode perfectly so as not to disturb the deposition of the subsequent layers and, on the other hand, the length to be covered is significant, particularly when the connection with the lower electrode is made over the entire periphery of the substrate.

Next, during the removal of the mask, the layers which have been deposited thereon have a tendency to disintegrate and then to be redeposited on the multilayer stack in the form of particulates, thus causing the device to malfunction. This is why, so as to avoid such a drawback, the removal of the mask is usually accompanied by vacuum suction, which requires two operators to perform this operation.

Moreover, during the deposition of the various layers following the application of the adhesive mask, the latter sometimes shrinks under the effect of heat, as a result, during the application of the electrically conductive layer forming the upper electrode, the latter may come into contact with the lower electrode thus creating a more or less partial short-circuit having the effect of reducing the contrast that the device is able to deliver. To alleviate such risk a controlled margin is produced at the periphery of the region covered by the mask, which is to say a gap passing through the various deposited layers, stopping on the layer forming the lower electrode.

In addition, the selection of the adhesive mask is a delicate operation insofar as the latter must preserve its integrity despite the various physical stresses to which it is submitted during the deposition of the various layers. It must thus be able, in particular, to withstand significantly low pressures without outgassing, and have a good temperature resistance. As a consequence of such very strict specifications the cost of the adhesive mask is usually high.

As regards the problems associated with the connection between the connectors and the electrodes, although, with the aforementioned technique, this connection to the lower electrode may be a solder joint, this is not the case for the upper electrode since any soldering of the latter pierces it causing a connection with the lower electrode making the glazing assembly unusable through short-circuit. This is why, the electrical connection is ensured by simply making contact between the connector and the electrode.

Beside the fact that this electrical contact is imperfect, this mode of contacting risks causing, in use, perforation of the electrode and thus degradation of the functionality of the glazing.

In addition, because of the poor current distribution over the electrode the durability of the device is degraded.

One aim of the present invention is to remedy the aforementioned drawbacks by providing a controlled-transparency electrochromic device in which the electrodes may be soldered, particularly ultrasonically soldered, to the current-supply connectors.

One subject of the present invention is thus electrochromic device having controlled transmission or reflection of at least one electrically controllable active area, having, on a carrier substrate, a multilayer stack comprising at least, in succession, a layer forming a lower electrically conductive electrode, various functional layers at least one of which is an electrochromic layer, at least one of these layers being electrically insulating, and an upper electrically conductive electrode, in which device:
 at least one partition, denoted "total", extends from the insulating layer without passing through it, and passes through the layer(s) separating the insulating layer from the substrate, this total partition dividing the surface of the lower electrode into two regions electrically isolated from each other, namely a free region, in line with which the upper electrode is soldered to a first current-supply connector, and an active region containing the active area; and
 at least one partition, denoted "selective", passes through the upper electrode and the various layers separating the upper electrode from the lower electrode, this selective partition dividing the surface of the upper electrode into two regions electrically isolated from each other, namely a free region that receives a second current-supply connector which is soldered to the lower electrode, and an active region containing the active area.

The carrier substrate will be preferably a substrate having a glazing function and, in particular, is made of glass or plastic.

According to the invention the free region of the lower electrode will be soldered to the current-supply connector of the upper electrode and at least one of the solder joints between a current-supply connector and an electrode will be ultrasonically soldered.

In an implementation variant of the invention the upper electrode is covered with at least one moisture protection layer, the latter being penetrated by said selective partition.

Moreover, said electrically insulating layer will possibly be a tantalum oxide ($Ta_2O_5$) layer deposited on the lower electrode.

According to the invention at least one of the electrodes of the device will be formed from at least one indium tin oxide (ITO) layer.

In an implementation variant the upper electrode will possibly be in contact with an array of fine electrically conducting wires connected to at least one connector.

This array of wires will be preferably supported by a support made of a thermoplastic polymer, particularly made of polyurethane or polyvinyl butyral (PVB).

The free regions defined by the total partitions and selective partitions are located preferably on the periphery of the substrate which will be, in particular, rectangular shaped. Moreover, the total partitions and selective partitions will possibly be respectively produced so as to be parallel with opposed sides of the substrate.

In a variant, the total partitions will be produced in the four corners of the substrate so as to constitute substantially square free regions, and the selective partitions will be produced substantially in the middle of the periphery of the edges of said device so as to constitute substantially rectangular free regions.

The subject of the present invention is also a process for fabricating an electrochromic device having controlled transmission or reflection of at least one electrically controllable active area (CDEF), having, on a carrier substrate (3), a multilayer stack comprising of at least, in succession, an electrically conductive layer forming a lower electrode (4), various functional layers at least one of which is an electrochromic layer, at least one of these layers being electrically insulating, and an electrically conductive layer forming an upper electrode (9), comprising the steps consisting in:
 depositing, onto at least part of the surface of the substrate (3), at least one electrically conductive layer forming the lower electrode (4), and the layers preceding said electrically insulating layer;
 producing, starting from the electrically insulating layer without passing through it, at least one total partition (5) of the layer(s) separating the insulating layer from the substrate (3), each total partition (5) dividing the surface of the lower electrode (4) into two regions electrically isolated from each other, namely a free region (4a), and an active region (4b) containing the active area (CDEF);
 depositing, onto the free and the active regions (4a, 4b), the electrically insulating layer (7a), the various other functional layers (7) and the electrically conductive layer forming the upper electrode (9);
 producing at least one selective partition (12) through the upper electrode and through the various layers separating the upper electrode from the lower electrode (4), each selective partition (12) dividing the surface of the upper electrode (9) into two regions electrically isolated from each other, namely a free region (9a) and an active region (9b) containing the active area (CDEF);
 soldering a current-supply connector (15) to the active region (9b) of the upper electrode (9); and
 soldering a current-supply connector (15) to the free region (9a) of the upper electrode (9) and to the active region (4b) of the lower electrode located in line with the latter.

Advantageously the current-supply connector will possibly be soldered at the upper electrode to the free region of the lower electrode.

Preferably the partitions will be produced by means of a laser beam.

According to the invention at least one of the solder joints will be ultrasonically soldered.

Moreover, several electrochromic devices will possibly be produced on one and the same carrier substrate. To do this, once said devices are completed, the carrier substrate and all the layers deposited thereon will be cut so as to constitute specific devices.

The subject of the present invention is also electrochromic glazing, characterized in that it includes an electrochromic device as previously described, in particular having a variable light and/or energy transmission and/or reflection, with the substrate or at least part of the substrates transparent or partially transparent, made of plastic, preferably mounted as multiple and/or laminated glazing or as double glazing.

The subject of the present invention is also the use of such glazing as architectural glazing, as automotive glazing, as glazing for industrial vehicles or for public transport—by rail, sea or air—for agricultural vehicles, for construction site machinery, for rear-view or wing mirrors or for other mirrors, for displays and signage and for camera shutters.

Various embodiments of the present invention will be described hereafter, by way of nonlimiting example, and with reference to the appended drawings in which:

FIG. 1b is a schematic top view illustrating the embodiment shown in FIG. 1a;

Shown in FIGS. 1a to 5b are the essential phases of the various embodiments of a controlled-transmission electrochromic device 1 according to the invention which, in particular, is intended to applied in the construction of glazing the transparency of which it is desired to be able to adjust.

Figure 1A:
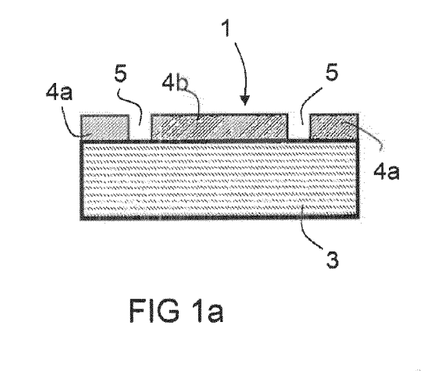
FIG. 1a shows a schematic vertical cross section, along the line AA of FIG. 1b, illustrating a first phase of a first embodiment of an electrochromic device according to the invention.
Figure 1B:
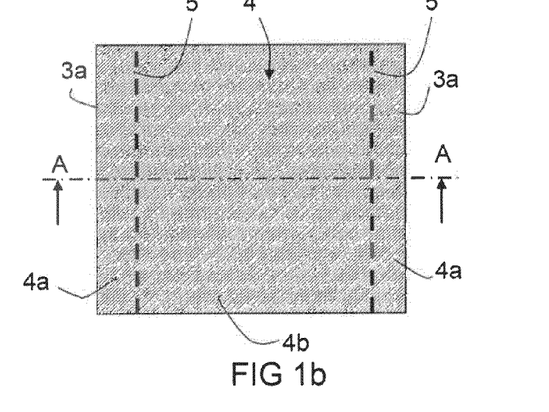

In a first phase, as shown in FIGS. 1a and 1b, an electrically conductive layer intended to form a lower electrode 4 is deposited on a carrier substrate 3 constituted, in the present mode of implementation, of a glass support. This deposition is, in particular, carried out by a conventional sputtering process. In a known manner this electrode may be of a metal type, or of a transparent conductive oxide (TCO) type made of $In_2O_3$:Sn (ITO), $SnO_2$:F or ZnO:Al. It may also possibly be a multilayer of the TCO/metal/TCO type, this metal being chosen, in particular, from silver, gold, platinum and copper, or a multilayer of the NiCr/metal/NiCr type, the metal being chosen, in particular, from silver, gold, platinum and copper.

In a second phase of the process, a straight partition 5 is produced as a border of two opposed sides 3a of the glass substrate 3, each parallel to said sides.

The term "partition" should be understood in the present text to mean a transection made through certain layers of the device, the width of which is sufficient for each part of a transected layer to be electrically isolated from the other part. The partition will be said to be "total" when it extends depthwise from the first of the eventual insulating layers without passing through this insulating layer, and will pass through the various other layers which separate it from the substrate 3 until the substrate is reached. The partition will be said to be "selective" when it extends from a given layer, passing through this given layer as well as the layers which separate it from the lower electrode 4 stopping on, without passing through, the lower electrode. These partitions will be preferably produced, in a known manner, by means of a laser beam, but any other means for producing them, as described above, may also be used.

Figure 1C:
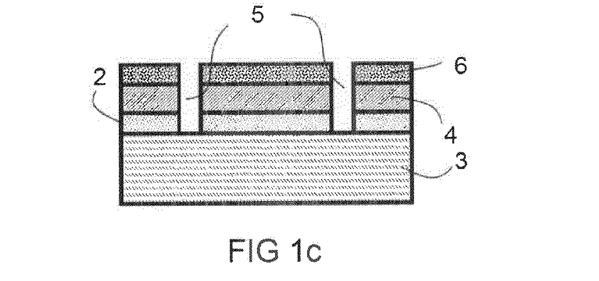
FIG. 1c is vertical cross section illustrating a variant of the production phase shown in FIGS. 1a and 1b.

FIG. 1b thus shows (as dotted lines) the total partition 5. It should be understood that, as shown in FIG. 1c, the deposition of the layer forming the lower electrode 4 may be preceded by the deposition of an adhesion layer 2 or a barrier layer that prevents the migration of alkali metals coming from the substrate, in particular a layer made of silicon nitride and/or a mixed tin silica oxide. In this implementation variant the total partition 5 then passes through the layers 2 and 4. Moreover, assuming the layers that follow the lower electrode 4 are current-conducting layers, the latter would be would be deposited before the total partition. Thus in the variant shown in FIG. 1c, the lower electrode 4 is covered by a conductive layer 6 of iridium oxide IrOx, the latter being penetrated by the total partition 5.

Each of the two partitions thus divides the surface of the lower electrode 4 into two regions, namely a first region denoted "free" and a second region denoted "active". In the present mode of implementation, the active region is common to both partitions and it contains the region that will be the active area CDEF of the device, which is to say the area wherein the transmission of light will be controlled as explained below.

Figure 2A:
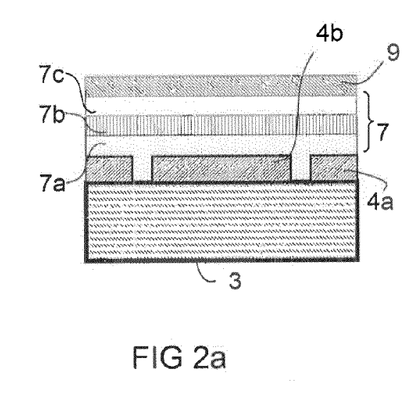
FIGS. 2a and 2b show, respectively, a schematic vertical sectional view along the line AA of FIG. 2b and a schematic top view illustrating a production phase of a total partition according to the invention.
Figure 2B:
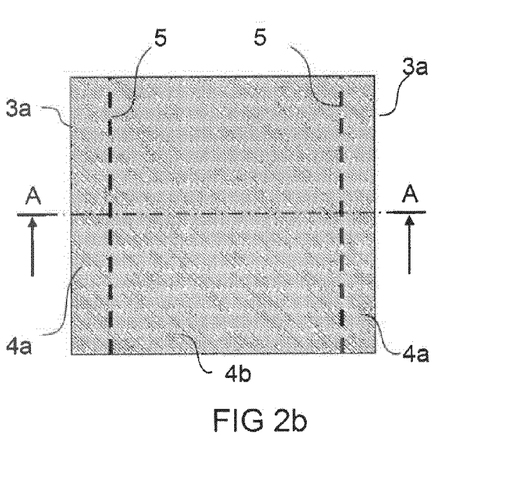

Next, as shown in FIGS. 2a and 2b, a series of layers 7 forming the functional electrochromic assembly are deposited, the first of these layers being an electrically active layer 7a deposited in an electrically insulating state, followed by an electrolyte layer 7b and a second electrically active layer 7c. The layer forming the upper electrode 9 is then deposited.

When the first layer 7a deposited after the production of the two total partitions 5 is an insulating layer, the regions 4a and 4b are not only electrically isolated from each other but also from the other layer of the multilayer stack.

Figure 3A:
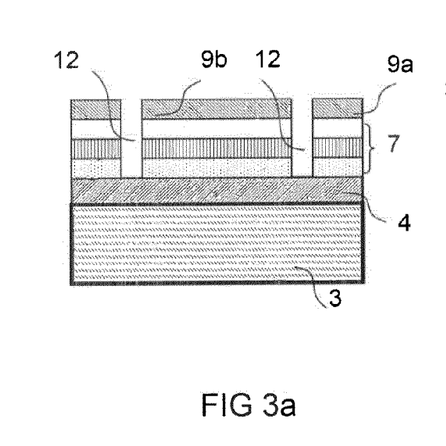
FIGS. 3a and 3b show, respectively, a schematic vertical sectional view along the line BB of FIG. 3b and a schematic top view illustrating another production phase of a selective partition according to the invention.
Figure 3B:
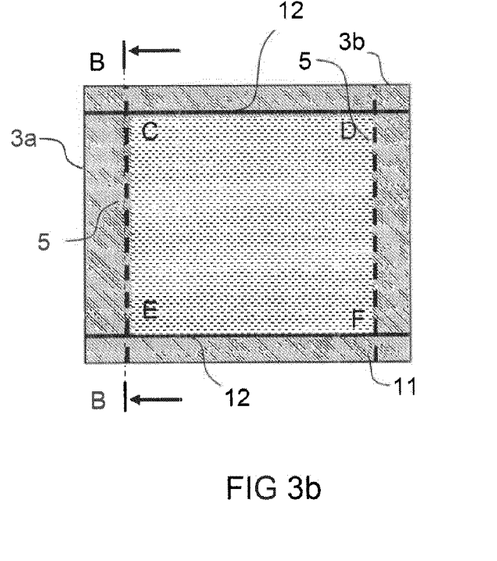

Next, as shown in FIGS. 3a and 3b, two other partitions 12 are produced as borders of the two other opposed sides 3b of the substrate 3, these other partitions being shown as continuous lines in the figures. These two partitions are the selective partitions that extend through the upper electrode 9 and through the functional electrochromic layers 7 stopping on the lower electrode 4 without passing through the latter. These two partitions 12 thus divide the surface of the upper electrode 9 into two regions, namely a first region 9a denoted "free" and a second region 9b denoted "active". In the present mode of implementation, the active region is common to both partitions and it contains the active area CDEF of the device as explained below.

It is noted that each of the free regions 4a defined by each total partition and each of the free regions 9a defined by each selective partition is electrically isolated, on the one hand, from the other free regions 4a and 9a and, on the other hand, from the respective active regions 4b and 9b or the lower and upper electrodes containing the active area CDEF of the device. Each of the free regions of an electrode may therefore be connected to an active region of the other electrode without causing a short-circuit.

Figure 4A:
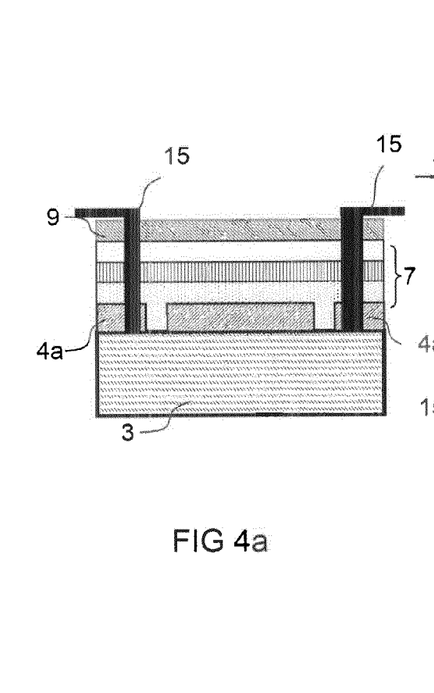
FIGS. 4a and 4b show, respectively, a schematic vertical sectional view along the line AA of FIG. 4b and a schematic top view illustrating a phase of soldering a connection element to the upper electrode of the device according to the invention shown in the preceding figures.
Figure 4B:
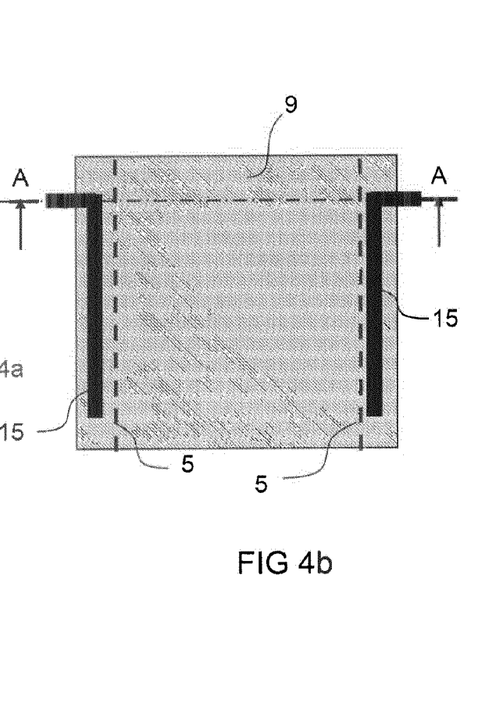
Figure 5A:
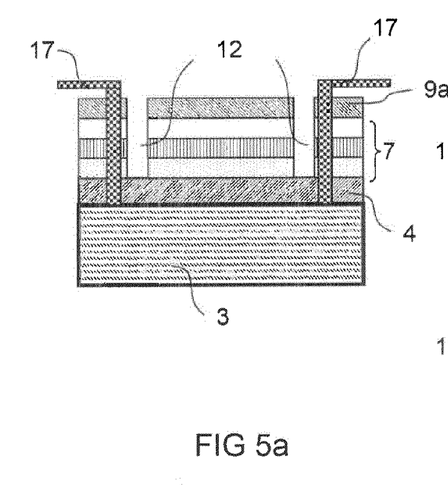
FIGS. 5a and 5b show, respectively, a schematic sectional view along the line BB of FIG. 5b and a schematic top view illustrating a phase of soldering a connection element to the lower electrode of the device according to the invention shown in the preceding figures.
Figure 5B:
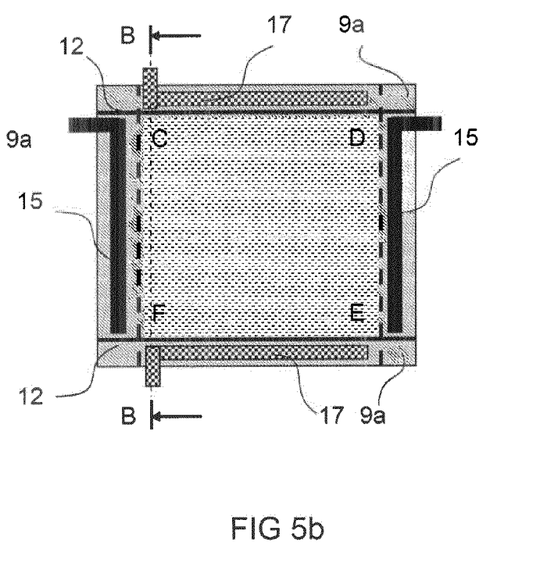

The invention therefore makes it possible, as shown in FIG. 4a, to solder, especially by ultrasonic soldering, a connection lead 15 to the upper electrode 9 together with, during this operation, the free region 4a of the lower electrode 4 placed in line therewith, i.e. on a perpendicular to the surface of the substrate, without thereby causing a short-circuit. Likewise, as shown in FIGS. 5a and 5b, a connection lead 17 may be soldered to the lower electrode 4 from the free region 9a of the upper electrode 9 without this operation causing a short-circuit.

Figure 6:
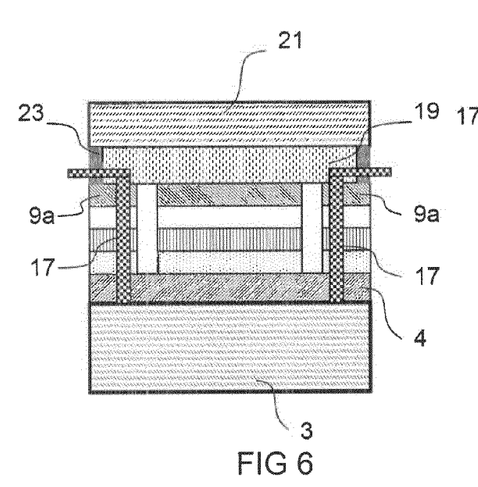
FIG. 6 is a schematic vertical cross section illustrating the final production phase of the device according to the invention shown in the preceding figures.

Once the connection leads 15 and 17 are connected by soldering, the multilayer stack may be completed in the conventional manner, as shown in FIG. 6, by depositing onto the multilayer stack a lamination interlayer 19, especially one made, as known, of a thermoplastic polymer, for example polyurethane or polyvinyl butyral (PVB), and then, to finish, a back substrate 21. The dimensions of the lamination interlayer 19 will be preferably slightly smaller than those of the other layers of the multilayer stack, so as to allow the application, on the periphery, of a seal 23 through which the connection leads 15 and 17 will pass and which will thus contribute to keeping the leads in place. The assembly will then be laminated.

In this mode of implementation of the invention the active area CDEF of the device is bounded by the total partitions 5 (dotted lines in the figures) and the selective partitions 12 (continuous lines in the figures). The present invention makes it possible to minimize the area of the free regions in line with which the connections are made, thus increasing the active area of the device compared with the solutions of the prior art.

Figure 7:
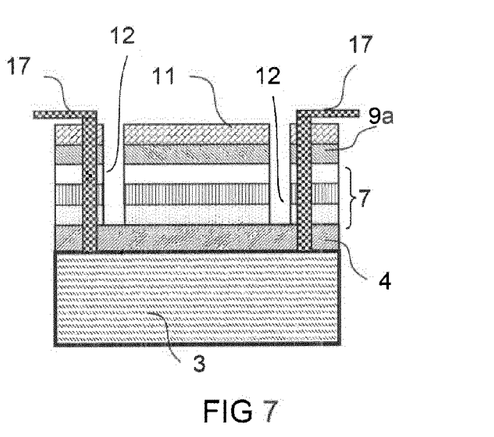
FIG. 7 is a schematic vertical sectional view along the line BB of FIG. 5b of another implementation variant of the invention.

Of course, according to the invention, the device will possibly not be laminated and the multilayer stack may then be finished with the deposition of a moisture protection layer 11, which, as shown in FIG. 7, will be penetrated by the selective partition 12.

Moreover, it is known that when the transmission of the active surface is varied, for example a transparency variation, this variation is not an immediate uniform-density variation over the whole of this active surface. Because of problems particularly associated with the resistivity of the various electrochromic layers in question, as well as with a resistivity difference between the upper and lower electrodes, the geometrical variation in time of the transparency of the active surface, denoted "occultation profile" hereinafter, may take various aspects depending on the arrangement of the connection leads 15 and 17 on the electrodes, as explained below.

The present invention enables the device designer to produce electrochromic devices with the greatest of ease, the connection leads of which may be shaped and arranged on the electrodes depending on the desired occultation profile.

Figure 8:
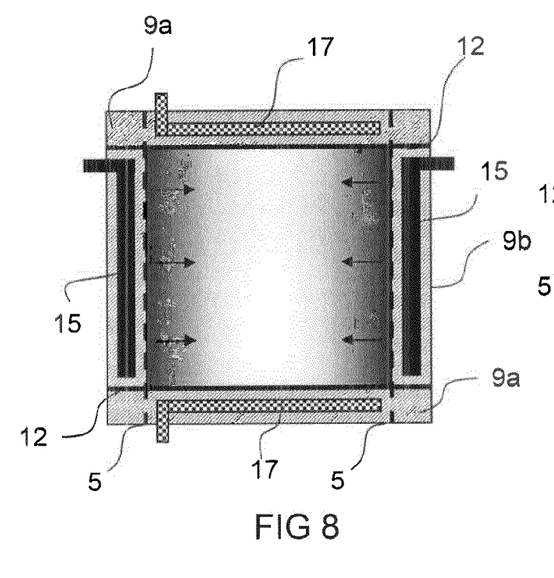
FIG. 8 is a top view illustrating the occultation profile of the device according to the invention shown in the preceding figures.

Thus, with the arrangement of the connection leads previously adopted, an occultation profile having the form of a curtain that moves from the edges 3a toward the center, shown schematically in FIG. 8, is obtained.

Figure 9:
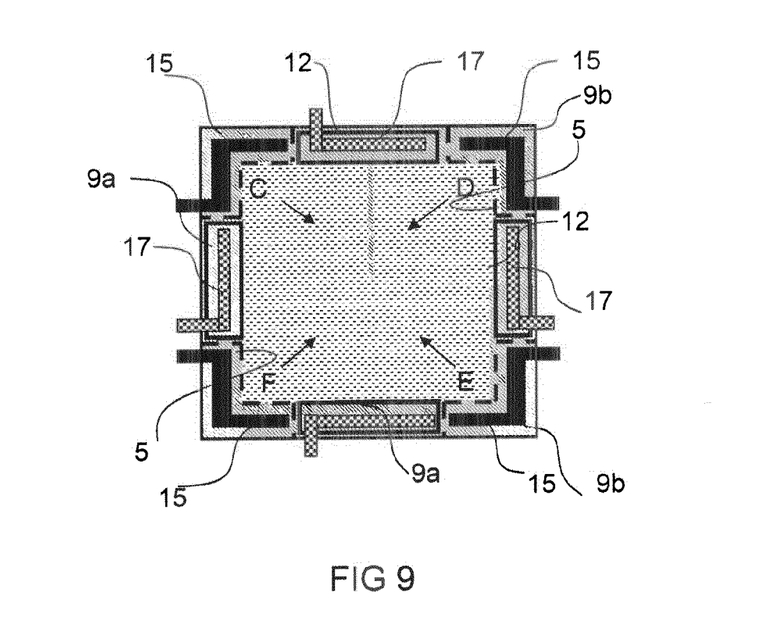
FIG. 9 is a top view of a second mode of implementation of a device according to the invention.

In order to obtain a more uniform occultation profile, a configuration of the sort shown in FIG. 9 may also be adopted.

To obtain this configuration, after the deposition onto the substrate 3 of the layer 4 forming the lower electrode, and, as explained previously, a total partition 5 is produced through the latter in each of the corners of the substrate 3 (dotted lines in the figure) so as to form in the lower electrode a square free region 4a. Next, the various functional electrochromic layers 7 and the layer 9 forming the upper electrode are deposited. Next, a selective partition (shown as a continuous line in the figure) is produced through the upper electrode, said partition passing through the deposited layers stopping on the lower electrode 4 without passing through the latter. This partition 12 has the form of a continuous closed line of rectangular shape which is located on the periphery of the substrate 3 and centered on each of the sides of the substrate and which divides the surface of the upper electrode into two regions, namely a free region 9a and an active region 9b containing the active area CDEF of the device.

Figure 8A:
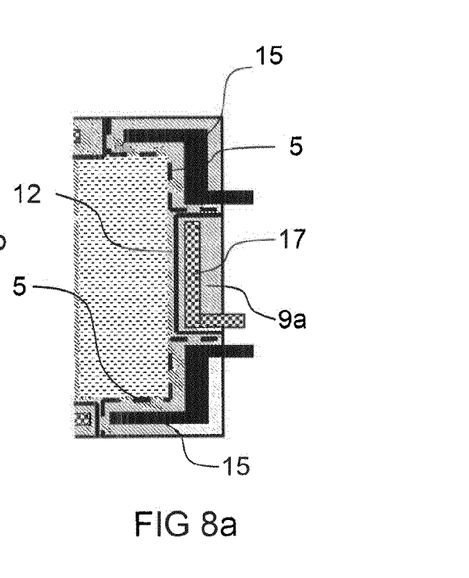
FIG. 8a is a partial top view of a variant of the device shown in FIG. 9.

It would also be possible, as shown in FIG. 8a, to produce each of the selective partitions 12 with just three sides, the fourth coinciding with the edge of the substrate.

Figure 10:
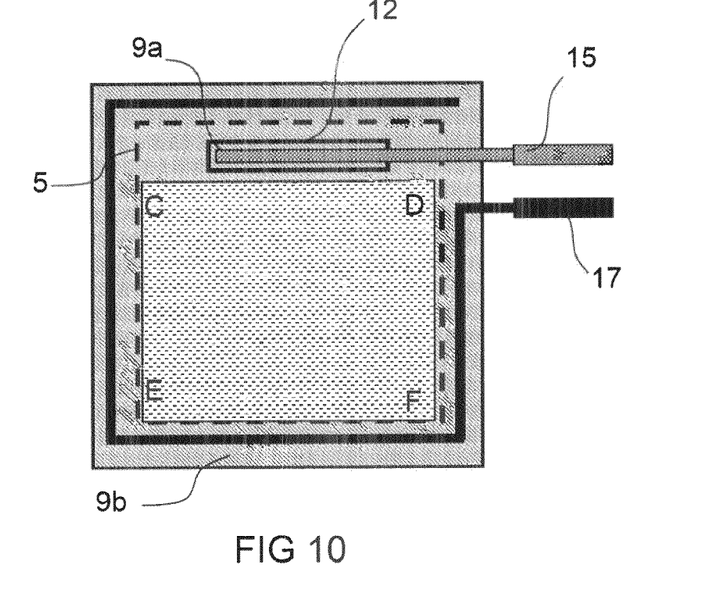
FIGS. 10 and 11 are top views of two variant embodiments of the device according to the invention.

In another implementation variant, shown in FIG. 10, a total partition 5 (dotted lines) is produced all the way round the periphery of the substrate 3, the connection lead 15 connected to the lower electrode 4 being soldered within the total partition in a free region 9a bounded by a selective partition 12 following a closed line, and the connection lead 17 connected to the upper electrode 9 being soldered outside the total partition, in line with the free region 4a of the lower electrode 4.

Of course the location of the partitions, whether total or selective, is not limited to the periphery of the substrate. They could, depending on the application, be placed, completely or partly, in the central region of the substrate.

Figure 11:
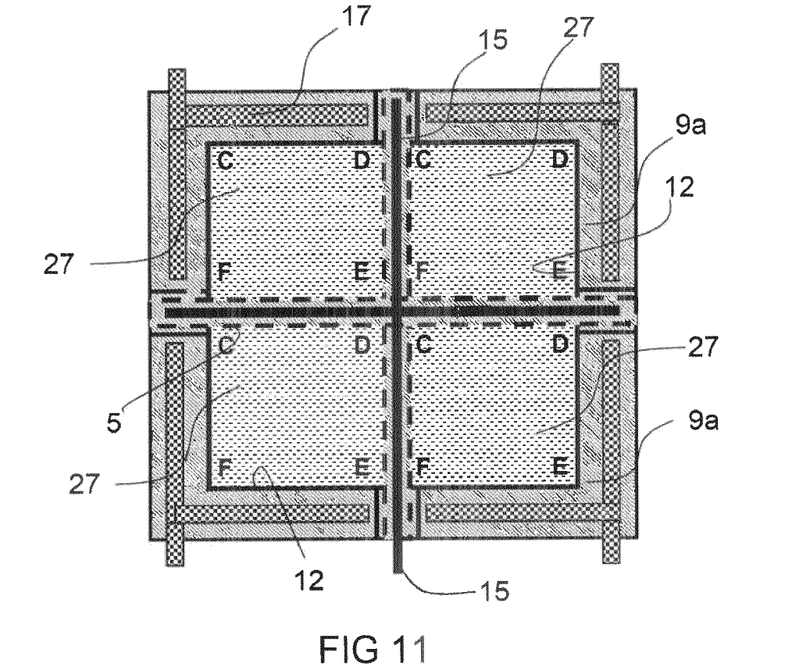

Thus, FIG. 11 shows an application in which it is desired to control individually or simultaneously the opacity of four windows 27 of a glazed wall.

For this purpose, the central portion of the substrate, in this case square shaped, is subdivided into four contiguous active areas CDEF. To do this a total partition is produced through the lower electrode 4, thus bounding at the lower electrode level a central cross-shaped free region 4a (shown in dotted lines in FIG. 11), and then, after the functional electrochromic layers 7 and the layer 9 forming the second electrode have been deposited, a total partition 12 is produced in the four corners, defining at the upper electrode level four square-shaped free regions 9a. The connection leads 15 of the upper electrode 9 are cross-shaped and are placed in line with the free region 4a of the lower electrode 4, and the connection leads 17 of the lower electrode 4 are square-shaped and occupy the free region 9a of the upper electrode 9 and are soldered, in particular by ultrasonic soldering, to the lower electrode 4. Each of the four devices thus constituted may be controlled individually when the connecting elements 17 are connected individually. These devices could also, of course, be controlled in an overall manner by joining of their connection leads.

The present invention thus allows the critical step of placement and removal of the masking adhesives to be eliminated from the electrochromic device fabrication process, which leads to a very significant time saving, while, at the same time, the reliability of these devices over time is improved because their electrodes are soldered to the connection means. By significantly reducing the leakage current the invention also allows an electrochromic device that has a reduced response time and that consumes less electricity to be produced. The invention finally allows the active area CDEF to be maximized with respect to the size of the support substrate and allows the shape of the device's occultation profile to be controlled.

The present invention is also applicable to electrochromic devices in which, in order to increase the conductivity of the upper electrode, an array of parallel conducting wires is added to the latter.

As is known, usually the upper and lower electrodes of electrochromic devices are made of doped metal oxides such as fluorine-doped tin oxide ($SnO_2$:F) or tin-doped indium oxide (ITO) which may be thermally deposited on various substrates, in particular by pyrolysis, on glass, such as the CVD technique, or cold deposition in particular using vacuum sputtering techniques.

It is found that, for thicknesses at which they remain transparent, layers made from these materials are not sufficiently electrically conductive: when an appropriate voltage is applied across their terminals, provoking the change-of-state modification necessary to modify their transmission, these layers increase the response time, or switching time, of the system.

More precisely, in the case for example in which the two electrically conductive layers are made of tin-doped indium oxide (ITO), the resistivity of the base layer, or lower layer, which is around 3 to $5\Omega/\square$, increases to $60$-$70\Omega/\square$ in the case of the upper layer because of its small thickness. Specifically, it is known that if the base layer has a thickness of around 500 nm, the upper layer itself has a thickness of only around 100 nm, for reasons essentially due to the mechanical strain generated in the multilayer stack.

It is this difference in resistivity between the upper and lower layers which causes the switching time of the device, i.e. the time needed for the system to switch from its most transparent state to its most opaque state, to be slower. Such a slowing moreover contributes to the formation of the previously mentioned "halo" phenomenon.

To alleviate such a drawback it was proposed, in application WO 00/57243, to increase the electrical conductivity of the upper conductive layer by adding to the latter an array of conducting wires separated from one another by a distance of around 1 to 3 mm.

Figure 12A:
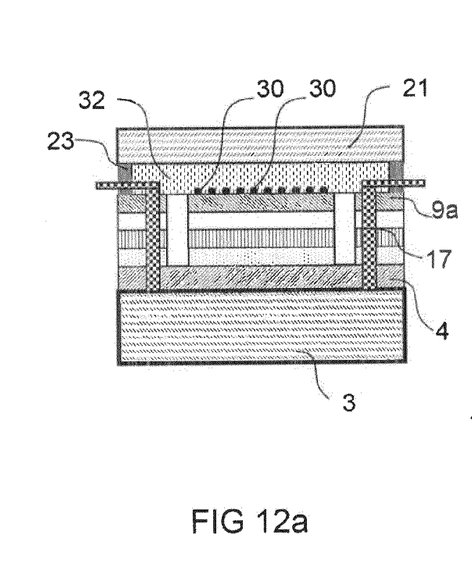
FIGS. 12a and 12b are, respectively, a schematic vertical sectional view along the line BB of FIG. 12b and a schematic top view of another embodiment according to the invention.
Figure 12B:
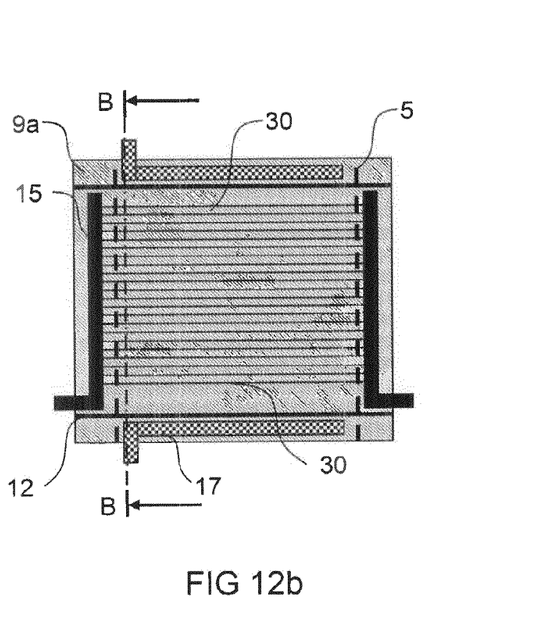

As shown in FIGS. 12a and 12b, such an array of wires 30 is placed on a interlayer support sheet 32 made of a thermoplastic polymer, in particular a sheet of polyurethane or polyvinyl butyral (PVB) which, during the lamination of the entire device, applies the array of wires 30 against the upper electrode 9. The resistivity of the latter is thus lowered to values of around $0.5\Omega/\square$, thereby reducing the switching time of the system and the previously mentioned halo phenomenon.

Figure 13:
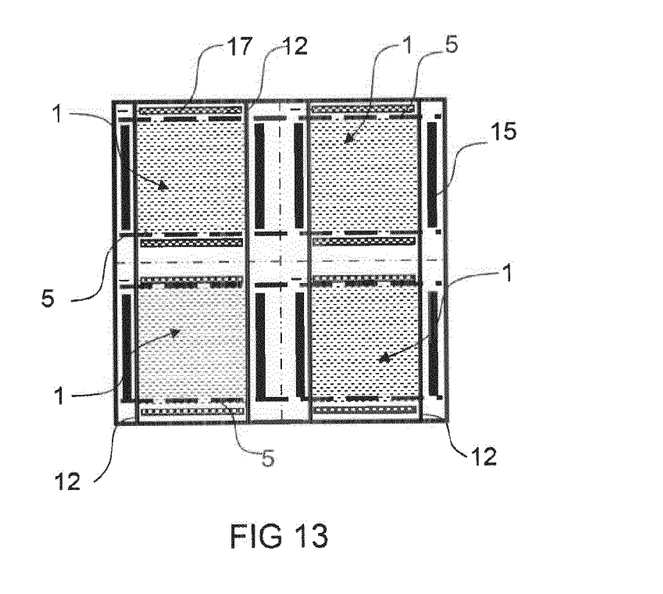
FIG. 13 is a schematic top view of another mode of implementation of the present invention.

Equally, according to the invention, several electrochromic devices 1 may be produced on one and the same support substrate. At the end of the fabrication process these devices will be separated by cutting the substrate along the lines 34 shown as dot-dash lines in FIG. 13, so as to constitute specific electrochromic devices 1.

Such a mode of implementation allow the production of only four total partitions and four selective partitions for four devices, which represents a simplification of and a time saving during fabrication.

The invention claimed is:

1. An electrochromic device having controlled transmission or reflection of at least one electrically controllable active area (CDEF), comprising, on a carrier substrate, a multilayer stack comprising at least, in succession;
    a layer forming a lower electrically conductive electrode;
    various functional layers, at least one of which is an electrochromic layer, and at least one of these layers being electrically insulating; and
    an upper electrically conductive electrode, in which device:
    at least one total partition extends from the electrically insulating layer without passing through it, and passes through the layer(s) separating the insulating layer from the substrate, the total partition dividing a surface of the lower electrode into two regions electrically isolated from each other, namely a free region, in line with which the upper electrode is soldered to a first current-supply connector, and an active region containing the active area (CDEF); and
    at least one selective partition passes through the upper electrode and the various layers separating the upper electrode from the lower electrode, the selective partition dividing a surface of the upper electrode into two regions electrically isolated from each other, namely a free region that receives a second current-supply connector which is soldered to the lower electrode, and an active region containing the active area (CDEF), wherein the free region of the lower electrode is soldered to the current-supply connector of the upper electrode.

2. The device as claimed in claim 1, wherein the carrier substrate comprises a glazing and, optionally, comprises glass or plastic.

3. The device as claimed in claim 1, wherein at least one of the solder joints between a current-supply connector and an electrode is ultrasonically soldered.

4. The device as claimed in claim 1, wherein the upper electrode is covered with at least one moisture protection layer, and the at least one moisture protection layer is penetrated by said selective partition.

5. The device as claimed in claim 1, wherein said electrically insulating layer is a tantalum oxide ($Ta_2O_5$) layer deposited on the lower electrode.

6. The device as claimed in claim 1, wherein at least one of the electrodes comprises at least one indium tin oxide (ITO) layer.

7. The device as claimed in claim 1, wherein the upper electrode is in contact with an array of fine electrically conducting wires, connected to at least the second connector.

8. The device as claimed in claim 7, wherein the array of wires is supported by a support.

9. The device as claimed in claim 1, wherein the free regions defined by the total partitions and selective partitions are located on the periphery of said device.

10. The device as claimed in claim 9, wherein the substrate is rectangular shaped and the at least one total partition and at least one selective are respectively produced so as to be parallel with opposed sides of the substrate.

11. The device as claimed in claim 1, wherein the at least one total is in four corners of the substrate so as to constitute substantially square free regions, and in that the at least one selective partition is substantially in the middle of the periphery of the edges of said device so as to constitute substantially rectangular free regions.

12. An electrochromic glazing, comprising an electrochromic device as claimed in claim 1.

13. An architectural, automotive, mirror, display, signage, or camera shutter glazing comprising the glazing as claimed in claim 12.

14. A process for fabricating an electrochromic device comprising controlled transmission or reflection of at least one electrically controllable active area (CDEF), having on a carrier substrate, a multilayer stack comprising at least, in succession: an electrically conductive layer forming a lower electrode;
- various functional layers at least one of which is an electrochromic layer, at least one of these layers being electrically insulating; and
- an electrically conductive layer forming an upper electrode, the method comprising:
(A) depositing, onto at least part of the surface of the substrate, at least one electrically conductive layer forming the lower electrode, and the layers preceding said electrically insulating layer;
(B) producing, starting from the electrically insulating layer, without passing through it, at least one total partition of the layer(s) separating the insulating layer from the substrate, each total partition dividing a surface of the lower electrode into two regions electrically isolated from each other, namely a free region, and an active region containing the active area (CDEF);
(C) depositing, onto the free and the active regions, the electrically insulating layer, the various other functional layers, and the electrically conductive layer forming the upper electrode;
(D) producing at least one selective partition through the upper electrode and through the various layers separating the upper electrode from the lower electrode, each selective partition dividing the surface of the upper electrode into two regions electrically isolated from each other, namely a free region and an active region containing the active area (CDEF);
(E) soldering a first current-supply connector to the active region of the upper electrode; and
(F) soldering a second current-supply connector to the free region of the upper electrode and to the active region of the lower electrode located in line with the latter wherein the first current-supply connector is soldered to the free region of the lower electrode.

15. The process as claimed in claim 14, wherein at least one of the solder joints is ultrasonically soldered.

16. The process as claimed in claim 14, wherein at least one of the total and selective partitions is produced by a laser beam.

17. The process as claimed in claim 14, further comprising producing
- several electrochromic devices having controlled transmission or reflection of at least one electrically controllable active area (CDEF), comprising, on a carrier substrate, a multilayer stack comprising at least, in succession;
- a layer forming a lower electrically conductive electrode;
- various functional layers, at least one of which is an electrochromic layer, and at least one of these layers being electrically insulating; and
- an upper electrically conductive electrode, in which device:
- at least one total partition extends from the electrically insulating layer without passing through it, and passes through the layer(s) separating the insulating layer from the substrate, the total partition dividing a surface of the lower electrode into two regions electrically isolated from each other, namely a free region, in line with which the upper electrode is soldered to a first current-supply connector, and an active region containing the active area (CDEF); and
- at least one selective partition passes through the upper electrode and the various layers separating the upper electrode from the lower electrode, the selective partition dividing a surface of the upper electrode into two regions electrically isolated from each other, namely a free region that receives a second current-supply connector which is soldered to the lower electrode, and an active region containing the active area (CDEF),
- on the same carrier substrate, and once said devices are completed, cutting the carrier substrate and all the layers deposited thereon so as to constitute specific devices.

* * * * *